Nov. 12, 1935. J. H. WEST 2,020,751
BUBBLER PLATE COLUMN
Filed May 25, 1933 7 Sheets-Sheet 1

INVENTOR
John Henry West
BY
Nathan, Bowman + Helferich
ATTORNEYS

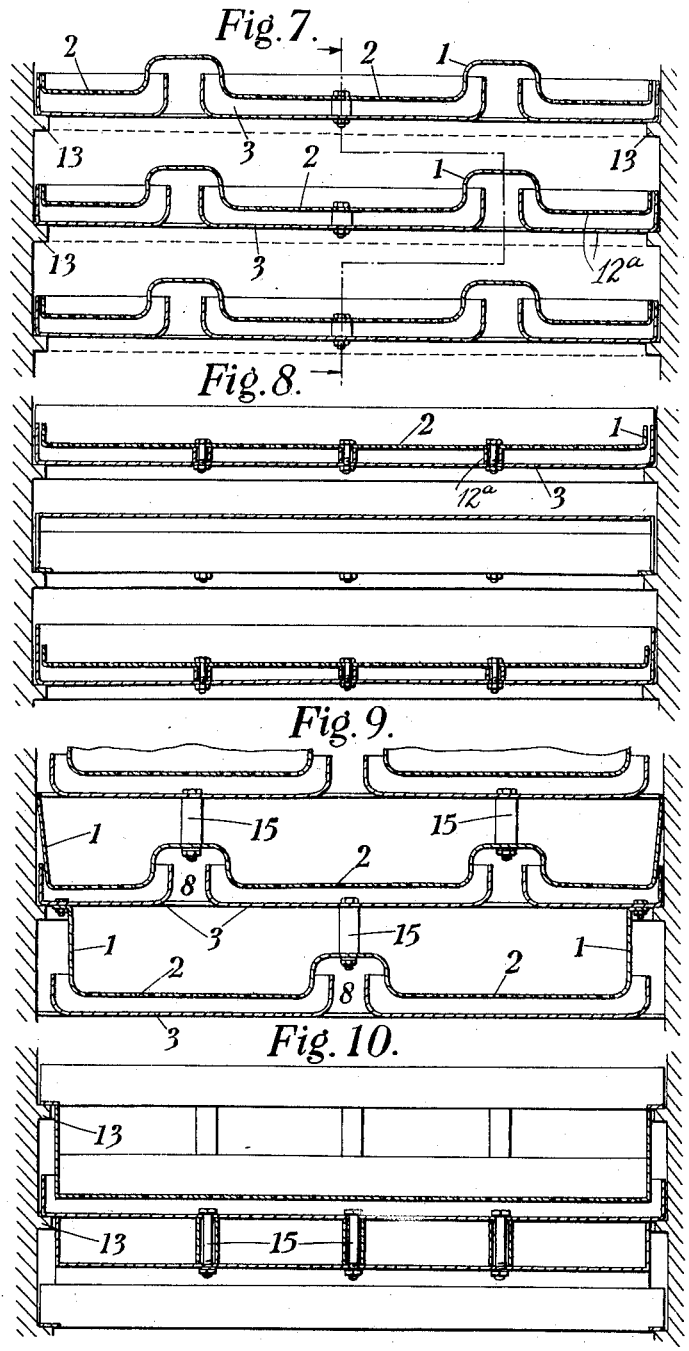

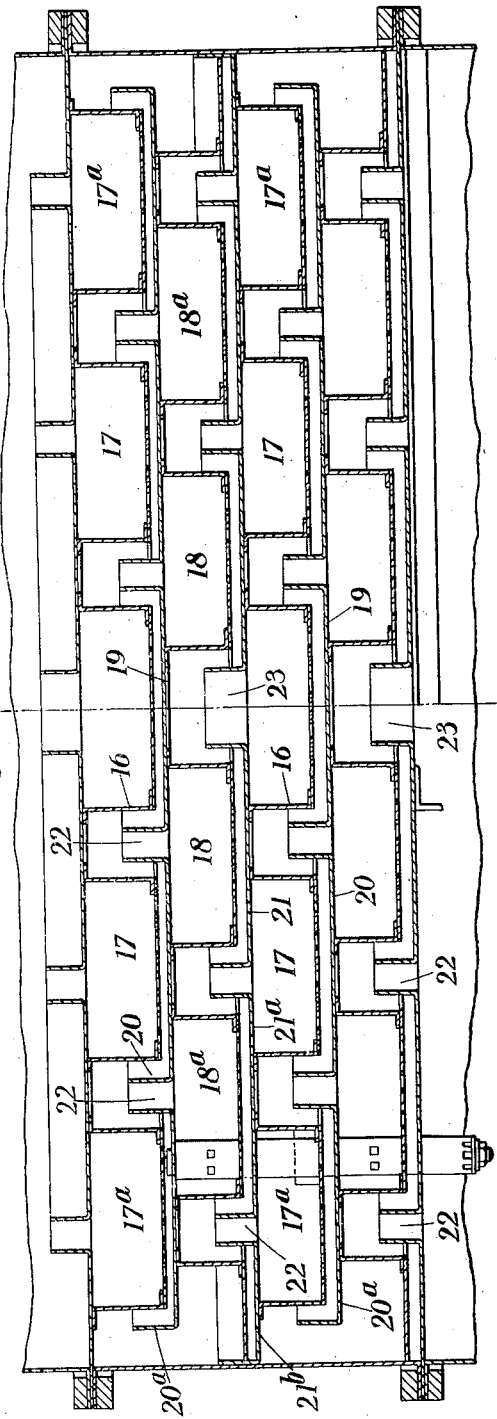

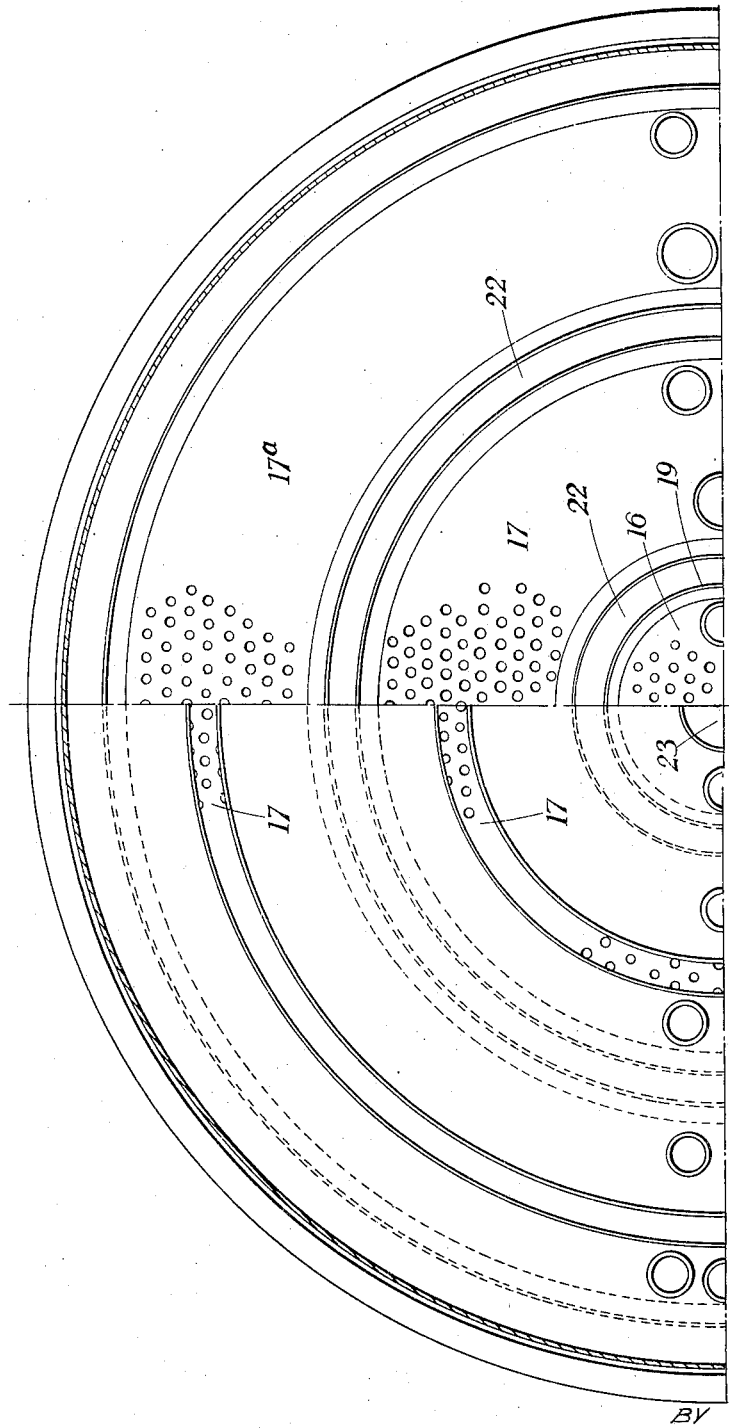

Patented Nov. 12, 1935

2,020,751

UNITED STATES PATENT OFFICE 2,020,751

BUBBLER PLATE COLUMN

John Henry West, London, England

Application May 25, 1933, Serial No. 672,855
In Great Britain June 1, 1932

13 Claims. (Cl. 261—113)

The present invention is concerned with improvements in plate columns for use in fractional distillation and other purposes where intimate contact to obtain equilibrium between vapour and liquid is sought, and in which the liquid descending the column is retained to a certain depth on each plate, and the vapours ascending the column are caused to bubble through these layers of liquids.

In practice the fractionating or other columns generally favoured are of the bell type in which a solid horizontal plate is provided with a number of vapour pipes covered by bells. In such bell type of bubbler-plate the duty of a plate of given size is practically limited by the total slot area of the bubblers and the total area of the vapour pipes which can be conveniently arranged on the plate, because the vapour velocity through the slots and the vapour pipes must not exceed a certain maximum figure, otherwise undue entrainment of the liquid will reduce the efficiency of the column, an average optimum speed in ordinary cases varying from 10 feet to 15 feet per second, although somewhat higher speeds are allowed for in certain work.

The less generally used perforated plate column consists of a cylinder containing horizontal plates or partitions provided over the whole surface with small holes through which the ascending vapour bubbles into the liquid on each plate. The descending liquid flows down from plate to plate through overflow pipes, the lower ends of which are sealed in the liquid, usually, with the aid of a cup, on the plate below, but it has been found that this type is wanting in flexibility since the vapour velocity must be maintained constant or at any rate within certain limits which are predetermined by the size and number of the perforations.

While it has previously been proposed to provide receiver troughs below the perforated plates to catch and prevent the liquid from flowing down the column should the plates empty themselves owing to the vapour pressure dropping temporarily, the known plates have been so designed that it has not been possible to distribute the vapour and liquid substantially evenly over the whole area of the foraminous floor whilst supporting the whole of the liquid above the floor and this defect is the more marked the greater the size of the plate.

The use of the aforesaid receiver troughs involves an arrangement of ducts to lead the vapour up to such a level above the receiver floor that the liquid is prevented from overfowing down the column during an inactive period of the column and to lead the vapour down to an inlet to the vapour space under the foraminous floors. It has been found that the form and arrangement of ducts is an important criterion of an economical and efficient column.

Another and vital consideration in columns of the kind with which this invention particularly deals is to contend with the fall in pressure which is liable to occur below the foraminous floor if the floor exceeds a certain width, an aspect which becomes of increasing importance when large columns are in question.

Moreover, if the desired object of bringing the whole of the liquid into intimate contact with the vapour is to be realized, not only must the vapour be distributed uniformly over the whole area of perforated floor but the flow of liquid must be substantially equal and uniform throughout each plate.

Certain designs of column plate theretofore proposed have severe limitations in respect of the size of column for which they are applicable. The aim of the present invention, however, is to provide a column plate having the attributes of economical construction and uniform vapour and liquid distribution and which at the same time, lends itself to construction in any size of column. Where vapours are fed through a single duct over the whole of a large floor area, the duct if made sufficiently large to observe the limiting velocity ratio and prevent entrainment will involve such an increase in the separation between the plates as seriously to militate against the commercial construction of the column. It can be determined mathematically that where a single central duct is employed in the plate of a cylindrical column, the smallest size of duct that will allow the vapour to pass up through the central tube, over the top of the tube, down an annulus concentric with the tube and through a peripheral outlet to the vapour space, this being the usual design of duct in such a plate, and not exceed the desired ratio between the velocity in the vapour space and that in the duct, is such that, assuming a velocity of one foot per second in the vapour space and 10 feet per second in the duct, the separation of the adjacent plates must be at least approximately 2 feet in an alcohol rectifying column of a diameter of 8' 6", which is a common diameter of column. Therefore such a column, having the normal number of distillation plates, i. e. 42, would be over 84' 0" in height.

By the present invention the maximum ratio of velocities having been determined, the ducts can be so proportioned as to occupy the minimum area of the plate whilst maintaining the limiting ratio substantially uniformly throughout the plate. A column of the same diameter, viz., 8' 6", can be built according to the present invention, with the same limitation in vapour velocities, in which the separation between the plates is reduced to 6", giving a height of 21 feet only.

In order that the present invention may be the more readily understood, reference is hereinafter made to the accompanying drawings, in which:—

Fig. 7 is a cross sectional view and Fig. 8 a cross sectional view at right angles to Fig. 7 of another form of apparatus.

Fig. 9 is a cross sectional view and Fig. 10 a cross sectional view at right angles to Fig. 9 of a further modification.

Figs. 11 and 12 are sectional view and plan view respectively of a circular apparatus.

Figure 1:
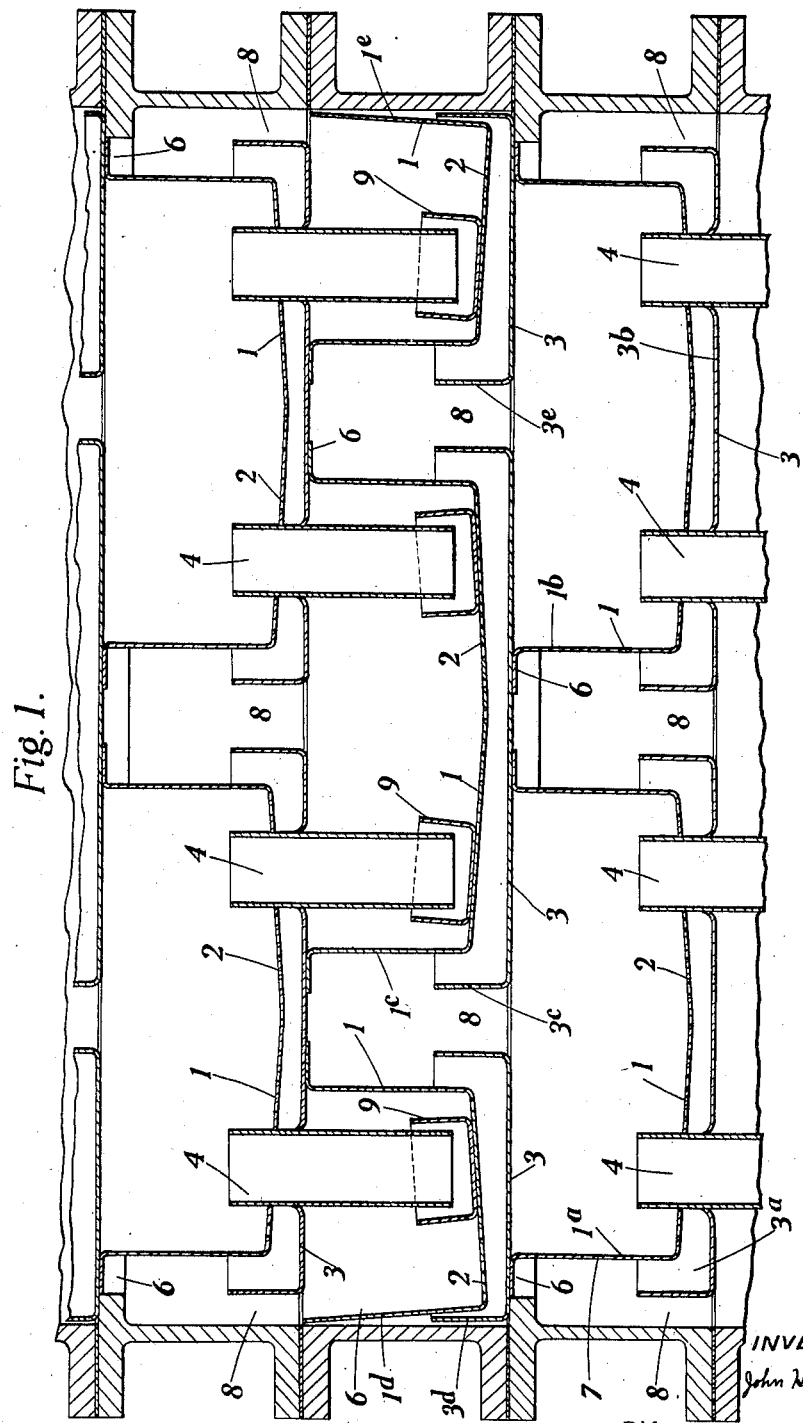
Fig. 1 is a cross section of one form of plate apparatus.
Figure 2:
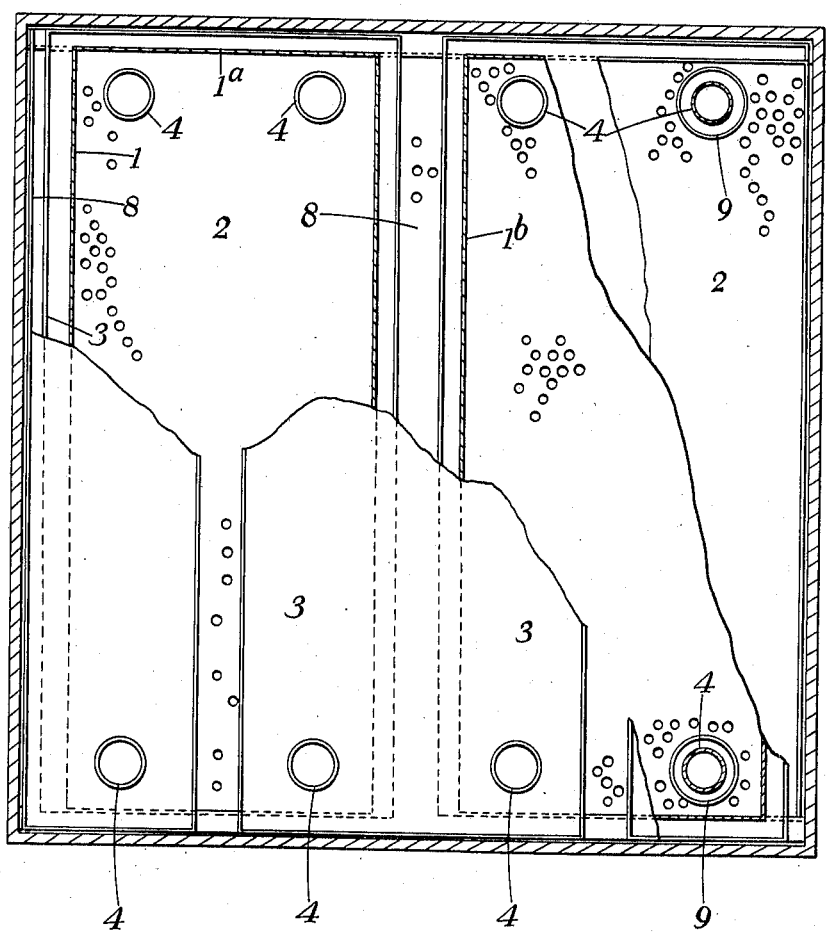
Fig. 2 a plan view.

Referring more particularly to Figs. 1 to 2, 1 are bubbler troughs having foraminous floors 2, and 3 are receiver troughs which in the assembled apparatus lie below the bubbler troughs, but with their sides rising above the foraminous floors 2. The bubbler troughs are flanged at 6 and secured to the underneath of the receiver troughs.

The bubbler troughs and the receiver troughs are arranged in staggered formation by providing alternately, in relation to the height of the columns, two complete laterally spaced bubbler troughs 1a, 1b, lying above two complete receiver troughs 3a, 3b on the one hand and one complete bubbler trough 1c, and two lateral half bubbler troughs 1d, 1e and corresponding complete and half receiver troughs, 3c, 3d, 3e respectively, on the other hand, or more than two complete troughs may be used on one half of the plates and the alternate plates provided with one fewer complete troughs and two lateral half troughs.

Figure 3:
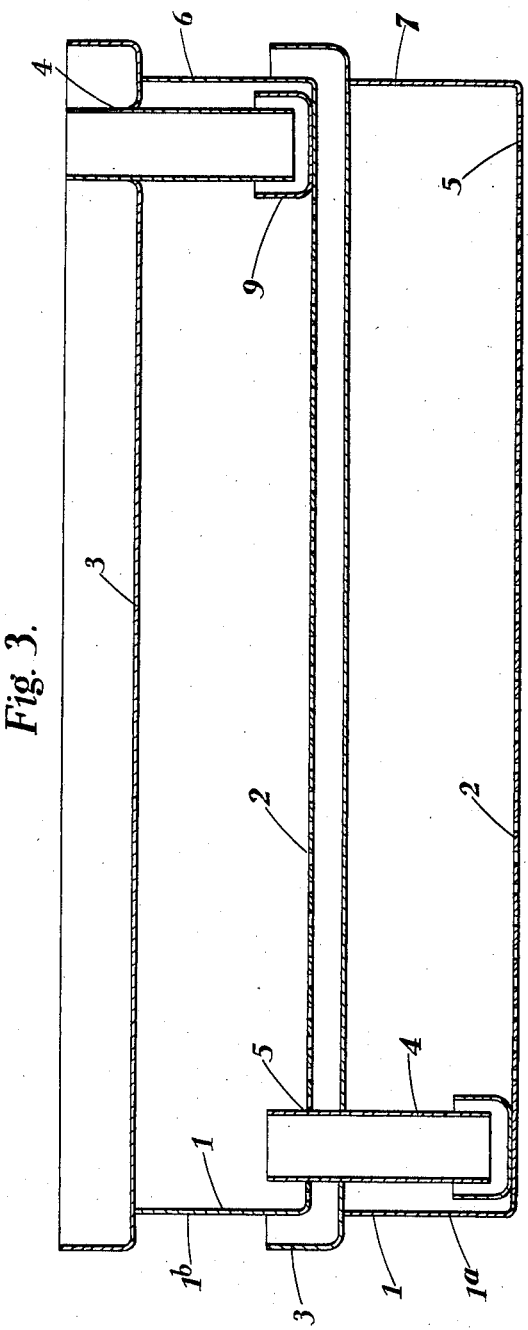
Fig. 3, is a cross section at right angles to Fig. 1, of two adjacent bubbler trough plates.

In each plate unit consisting of conjoined receiver troughs and bubbler troughs as shown in Fig. 3, overflow pipes 4 are disposed at one end and holes 5 are provided at the other end, the pipes 4 serving to permit liquid which has collected on the foraminous floor of the bubbler plate to overflow when a predetermined level is reached which is determined by the height to which the inlet end of the overflow pipe extends above such floor. The overflow pipes in one series of units, e. g., the units 6 having the complete and two half troughs, are located at the opposite end to that at which the overflow pipes in the alternative units 7 are located so that the liquid passes zig-zag fashion down the column. The holes 5, located in each unit at the opposite end to the overflow pipes, permit the passage of the overflow pipes extending upwardly from the unit below.

The bubbler troughs and the receiver troughs are essentially limited in width such that each row of perforations across a section of the bubbler trough parallel to the direction of vapour flow or substantially so is capable of substantially uniformly distributing the vapour coming through its own immediately adjacent section of vapour duct and not being greater than that necessary normally to retain substantially the whole of the liquid on the top of the perforated plate.

The lateral spacing of the bubbler troughs and receiver troughs provides vapour ducts 8 extending substantially over the whole length of the receiver and bubbler troughs, the ducts comprising an uptake portion formed between the upstanding sides of the receiver troughs or between the upstanding side of the receiver trough and the shell of the column and a downtake portion formed between the upstanding sides of the receiver troughs and the sides of the bubbler troughs, and these uptake and downtake portions extend over the whole length of the troughs so that the horizontal component of the path of the vapour as it travels from plate to plate is substantially at right angles to the side of the bubbler trough in the case of a straight trough (or radial in the case of the circular form of trough hereinafter described), both on the under and the upper sides of the plate, and each line of perforations in the foraminous floor in the direction of vapour flow is fed with vapour by the section of duct or ducts immediately opposite thereto.

For economic reasons the troughs are kept as wide as is consistent with the above bearing in mind the saving of space obtainable by making the perforated area as great as possible in regard to the total area provided the stream of vapour is adequately divided into a series of bubbles to promote intimate contact between liquid and vapour. In this way, a highly efficient scrubbing action is obtained between the liquid and the vapours and a maximum effective use can be made of the cross sectional area of the column since the total area of perforations can be made much more than ten per centum of the area of the plate, and furthermore the perimeter of the plate may closely conform to the frame or shell in which it is mounted and so conduce to economy of construction.

It will be observed that by the particular arrangement of the ducts and floors and the overflow means, the foraminous floors can be so arranged as to occupy considerably the greater part of the total area of the plate, in securing which the use of continuous up and down ducts is a contributing factor. Moreover, the flow of the liquid is substantially equally divided over all the foraminous floors in proportion to their areas so that the whole of the liquid is brought into intimate contact with the vapour substantially equally and uniformly throughout the plate.

In order to promote intimate scrubbing action between liquid and vapour in seeking to secure equilibrium between them, whilst minimizing entrainment of the liquid by the vapour, and normally retaining substantially the whole of the liquid on top of the foraminous floor and at the same time securing that the cross sectional area of the column is economically small in relation to its effective area, the total area of perforations should be as great a proportion of the total area of the plate as possible.

The optimum size of hole and the interspacing of the holes will depend for a given throughput per unit of cross sectional area upon the depth of liquid on the plate, the nature and viscosity of the liquid and also upon the amount of suspended solid matter in the liquid; also upon the width of the bubbler troughs. For example, it has been found in distilling a mixture of acetone and water, that $\frac{1}{16}$" to $\frac{1}{4}$" holes set at $\frac{1}{16}$" to $\frac{3}{8}$" equilateral pitch centres are quite satisfactory in complete troughs having a width of 9" and working at vapour velocity through the perforations ranging from five to ten feet per second. For liquids of high viscosity or of a dirty nature it will generally be necessary to use larger holes than those suited for liquids of low viscosity and free from suspended matter, but the optimum size and interspacing of the holes for various liquids can be determined by experiment.

In certain cases it may be desirable to vary the sizes of the holes in the foraminous floor in the direction of the flow of vapour.

With regard to the optimum width of the bubbler troughs, for a given size and interspacing of holes it is obvious that if many very narrow troughs are used the cost of construction will be unduly increased, but in any event the width must not be so great that the supply of vapour from the side of the trough is unable to reach the middle of a whole trough or the far side of a half trough thereby causing the perforations at the middle or the far side respectively to be wholly or partially ineffective as bubblers. It is to be understood that, in the case of a foraminous floor supplied with vapour from a single duct, the width of the floor will not nomally exceed 9 inches however large the plate, foraminous floors supplied with ducts on both sides having twice this width.

In the operation of the apparatus vapour rises in the column through the ducts 8 and in every instance it is caused to flow over a rim or wall of a receiver trough which rises above the foraminous floor of a corresponding bubbler trough and beneath such bubbler trough. Liquid collects in the bubbler troughs as a result of the column working, and the vapour rising through the foraminous floors of the troughs passes therethrough and thence through the vapour duct above and through the next bubbler trough, and so on. The side walls 14 of the bubbler trough act as seal plates.

In the case of all the complete bubbler troughs, i. e. all the troughs except those that have been hereinabove called half-troughs, the vapour flows in from both sides of the trough, this being permitted in the case of the bubbler troughs on the units 7 by the addition of the ducts formed between the outer side walls of such troughs and the column shell. In the case of the half-troughs the flow is in one direction only. In no case does the vapour have to travel more than half the width of a complete bubbler trough.

In this way, and by reason of the herein defined limitation of the width of the bubbler trough to the supply of vapour thereto, the vapour takes a short path uniformly across the whole area of the foraminous floor, and is substantially evenly distributed over the complete and half bubbler troughs, and this is realized with a notably compact assemblage of the multiple units.

Sealing cups 9 are preferably provided into which the overflow pipes discharge. These cups assist in preventing vapour from rising up the pipes and also permit a quiet discharge of the liquid overflow from above the foraminous floor of the bubbler trough above into the receiving bubbler trough above its foraminous floor.

In the apparatus above described, the vapour ducts are staggered, those on one unit with respect to those on the next.

It will be observed more particularly by reference to Fig. 3 that in this arrangement the top troughs of one constructional unit 7 act as receivers for the bubbler troughs of another constructional unit 6 thus providing for a very convenient mode of manufacture and assemblage.

Figure 4:
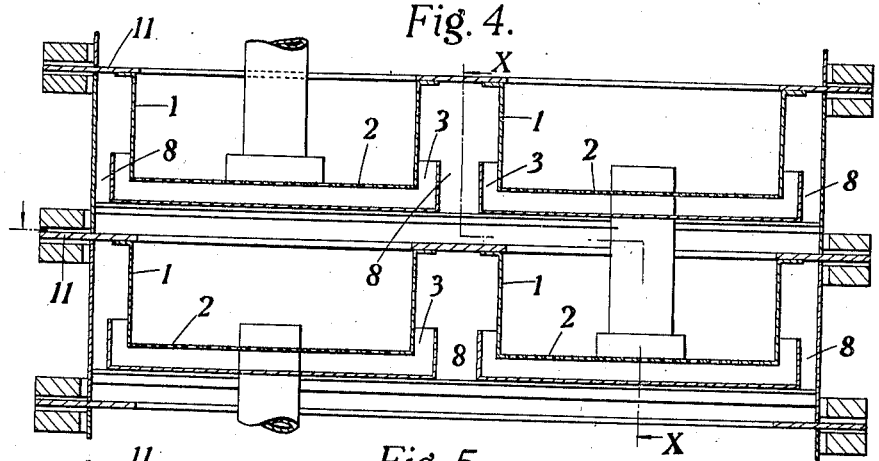
Fig. 4 is a cross section, Fig. 5 a cross section at right angles to Fig. 4
Figure 5:
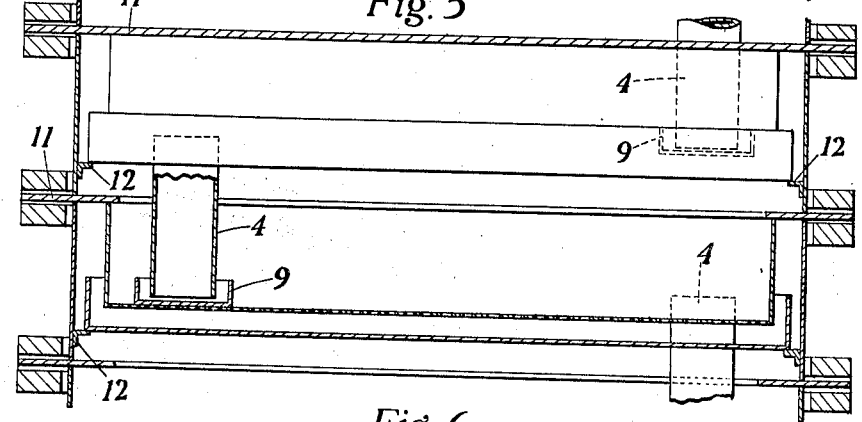
Figure 6:
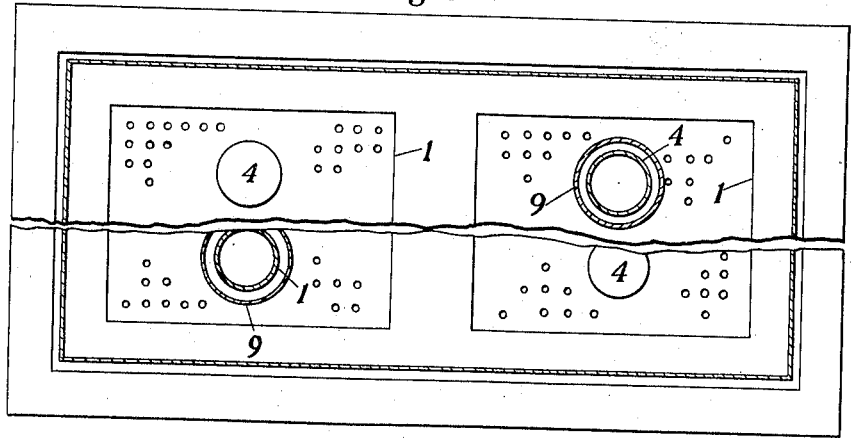
Fig. 6 is a plan view of a modified form of plate apparatus.

Figs. 4 to 6 depict the arangement in which the vapour ducts are in vertical alignment. In this arrangement the bubbler troughs depend from plates 11, instead of being attached below the receiver troughs for the next vertical abreast series of bubbler troughs as in Figs. 1 to 3, and the receiver troughs may be supported on ledges 12 on the column casing.

Figs. 7 and 8 show another arrangement in which the bubbler troughs and their receiver troughs are formed as constructional units 12 in which the receiver troughs are located below the bubbler troughs. These units rest on ledge 13 on the column casing.

Figs. 9 and 10 show another arrangement in which intercommunicating bubbler troughs are used, secured to the receiver troughs by spacing members 15.

In all these modifications and in the circular form of apparatus hereinafter described the width of the bubbler troughs is essentially limited as hereinbefore defined.

Figs. 11 and 12 show the application of the invention to a circular type apparatus. Central circular troughs 16 are employed and concentrically therewith are annular troughs 17, 17a, two such circular troughs being shown. Alternately, in relation to the height of the column, of such systems consisting of one central trough encircled by two annular troughs are arranged systems of annular troughs only, such troughs being indicated by numerals 18, 18a. The troughs 16, 17, 17a, and 18, 18a, are provided with foraminous floors as in the previously described constructions, and have circular receiver troughs 19, and annular receiver troughs 20, 20a, 21, 21a, 21b, respectively. 22 are annular vapour ducts and 23 are circular vapour ducts arranged centrally of the column.

The form of construction shown in Figs. 1 and 2 is particularly suited for large plates, since the girder like section of the units renders them self-supporting and rigid even when of considerable length.

The sectional formation of the shell of the column permits of ready disassemblage for access to the plate units for cleaning or repair.

In the case of the circular troughs the effect of the differential radii of the troughs on the proportionate delivery of the liquid to the respective foraminous floors, may be approximately compensated for by varying the total length of the weirs, formed by the overflow pipes. The small width of the troughs also allows the liquid to flow substantially evenly along the troughs even where the liquid is fed through circular pipes, and the action of the vapour bubbling through the floor also assists in rendering the flow of liquid substantially uniform.

A primary advantage of supporting the liquid above the foraminous floors, is that the vapour is separated into small bubbles before entering the liquid, so that a very great surface contact between liquid and vapour is realized. Furthermore, whilst increasing the depth of the liquid above the perforated plate may have the advantage of allowing longer time of contact between the vapour and liquid, any liquid remaining below the perforations is practically dead and useless so far as the desired object of obtaining equilibrium between vapour and liquid is concerned, and only adds to the weight to be carried by the plate, thereby requiring greater strength and rigidity, involving increased cost.

A further important advantage which proceeds from overflowing the liquid from the plate above on to the floor of the plate below and not into the receiver trough is the avoidance of the continual passage of liquid upwards through the perforations, with consequent partial blockage of the flow of vapour and also the tendency for surging to be set up which might easily arise if the liquid were delivered into the receiver trough. It is preferred to make the depth of the vapour space approximately equal to the distance between the outside of the bubbler trough and the upstanding edge of the receiver trough so that the liquid can be readily driven out from the vapour space in starting or restarting the apparatus and subsequently held above the floor.

In all the foregoing arrangements, where the vapour divides over adjacent bubbler troughs, the vapour divides evenly over the whole length of the troughs and passes through approximately equal size ducts formed between the sides of the bubbler troughs and the upstanding edges of the receiver troughs and operates over approximately one half of each trough fed by that duct, and where the vapour does not divide the single duct is likewise proportioned so that the effect is as if a number of substantially equal half troughs are used each with its own duct and this coupled with the disposition of the ducts along the whole course of the troughs results in a practically uniform vapour distributing over the whole foraminous floor area of the plate.

In any of the arrangements herein described the foraminous floor area is divided up so that the width of floor area of any one trough supplied by any one duct does not exceed the dimensions hereinbefore given so that by using a suitable number of troughs, the desired even vapour distribution can be effected over the whole foraminous area, even of the largest columns commercially used.

What I claim is:

1. A plate column of the kind described comprising a plurality of superimposed sets of bubbler troughs and receiver troughs, the bubbler trough of each set being arranged in spaced relation laterally and vertically with an underlying cooperating receiver trough and each of said bubbler troughs having approximately horizontal foraminous floors; means whereby each of said bubbler troughs receives liquid directly from the bubbler trough above substantially proportionate to the area of its foraminous floor comprising liquid overflow conduits extending from a point above the foraminous floor and within the bounds of the trough to a point above the foraminous floor and within the bounds of the bubbler trough below and so disposed as to cause the liquid to flow substantially uniformly along the said troughs, the lateral and vertical spacing of the bubbler trough and cooperating receiver trough of each of said sets providing respectively a plurality of vapor ducts substantially co-extensive with the adjacent side or sides of the bubbler troughs and vapor spaces between the floors of cooperating bubbler and receiver troughs in open communication therewith, the width of any one section of the foraminous floor supplied by any one of said vapor ducts, regardless of the size of the plate, preferably not exceeding 9 inches so that the vapor can be uniformly distributed to the respective foraminous floors having a high perforate to imperforate area ratio and substantially the whole of the liquid retained above such floors during the normal working of the column.

2. A column of the kind described divided into a plurality of bubbler plates, each plate comprising cooperating receiver troughs and overlying bubbler troughs, each of the said bubbler troughs having a foraminous floor intruding into the underlying cooperating receiver trough and lying in spaced relation with the floor thereof thereby to provide a vapor space between floors of cooperating troughs, the side walls of each of said sets of cooperating bubbler troughs and receiver troughs also being arranged in spaced relation laterally thereby to provide vapor ducts substantially co-extensive with the adjacent sides of the cooperating troughs in communication with the vapor space formed between the floors of cooperating bubbler and receiver troughs; liquid overflow means within the bubbler troughs arranged to deliver liquid from the foraminous floor of the bubbler trough of one set directly to the foraminous floor area of the bubbler trough of another set substantially proportionately to the area thereof, comprising conduit means extending from a point above the foraminous floor of one bubbler trough to a point above the foraminous floor of a bubbler trough below and means at the outlet end thereof for distributing the liquid and simultaneously excluding rising vapors; the width of any one section of foraminous floor supplied by any one vapor duct regardless of the size of the plate being such that the vapor supplied by the duct is uniformly distributed under the foraminous floors of the respective bubbler troughs and substantially the whole of the liquid retained above such floors during the normal working of the column.

3. A column of the kind described combining a plurality of sets cooperating receiver troughs and bubbler troughs, the bubbler troughs having foraminous floors intruding into underlying receiver troughs, the floor and side walls of each bubbler trough being spaced from the floor and side walls of the cooperating receiver trough thereby to provide respectively a vapor space between the said floors and a plurality of communicating uptake and downtake vapor ducts which are substantially co-extensive with adjacent side or sides of the troughs and in communication with the vapor space formed between the spaced floors of cooperating bubbler and receiver troughs; liquid overflow means extending above the foraminous floor of each bubbler trough arranged to discharge liquid from said floor to the foraminous floor of the bubbler trough of the set below substantially proportionately to the area thereof; the width of any bubbler trough being such that each row of perforations across a section of the troughs parallel or substantially parallel to the direction of the vapor flow is capable of distributing the vapor coming through its own immediately adjacent section of vapor duct substantially uniformly and not being greater than that necessary normally to maintain substantially the whole of the liquid on the top of the perforated floor of the bubbler trough.

4. The column of the kind described comprising a plurality of spaced bubbler plates, each plate comprising a receiver trough and a cooperating overlying bubbler trough, each of said bubbler troughs having foraminous floors intruding into and lying in spaced relation with the floor of its cooperating underlying receiver trough; overflow means within the bubbler troughs and extending above the foraminous floors thereof of each plate arranged to discharge above the foraminous floor of the bubbler trough of the plate below; liquid distributing and vapor sealing means at the discharge end of said overflow means; the relative spacing of the walls of said bubbler troughs and receiver troughs affording a plurality of vapor ducts substantially co-extensive with the adjacent side or sides of the bubbler troughs and in communication with the space formed between the floors of cooperating bubbler and receiver troughs, the ducts and floor areas of the respective plates being so proportioned in relation to the total area of the plates that the foraminous floors occupy considerably the greater part of said area, and the width of any one section of foraminous floor supplied by any one duct, regardless of the length of the trough, being approximately 9 inches so that the vapor ascending through said vapor ducts can be uniformly distributed over the foraminous floor and substantially the whole of the liquid retained above such floor during the normal working of the column.

5. A plate for a bubbler column of the kind described, divided into a plurality of spaced sets of superimposed receiver troughs and bubbler troughs, each of said bubbler troughs having a foraminous floor and arranged to intrude into an underlying cooperating receiver trough, the floors of said cooperating receiver and bubbler troughs being maintained in spaced relation to provide a vapor space therebetween; overflow means extending above the foraminous floors of the bubbler troughs arranged to discharge liquid above the foraminous floors of a lower bubbler trough; the side walls of the cooperating bubbler and receiver troughs being spaced apart laterally thereby to provide a plurality of vapor ducts substantially co-extensive with the side or sides of the bubbler troughs and in communication with the vapor space formed between the spaced floors of cooperating bubbler and receiver troughs, the lateral spacing between the walls of cooperating bubbler and receiver troughs serving to divide said cooperating troughs into units, said bubbler and receiver troughs being provided with continuous peripherial side walls so that substantially the whole of the liquid is caused to be driven into the bubbler troughs when starting or restarting the work of the column; the vapor ducts being so proportioned with relation to foraminous floors that the ratio of floor area to duct area is substantially uniform throughout, the width of any one bubbler trough supplied by any one duct being substantially 9 inches so that the vapor can be distributed substantially uniformly over the foraminous floor and substantially the whole of the liquid retained above such floors during the normal working of the column.

6. A column of the kind described comprising the plurality of superimposed spaced bubbler-plates, each plate comprising a receiver trough and an overlying cooperating bubbler trough having a foraminous floor intruding into and maintained in spaced relation with the floor of its cooperating receiver trough, each of said troughs having continuous peripheral side walls spaced from one another to provide a plurality of uptake and downtake vapor ducts substantially co-extensive with the adjacent side or sides of the bubbler trough and in open communication with the space between the floors of cooperating bubbler and receiver troughs; overflow means for each plate extending from a point above the foraminous floor of one plate and arranged to discharge above the foraminous floor of a plate below substantially proportionately to the area thereof; the ducts and floors of each plate being so proportioned and arranged in relation to the area of the plate that the foraminous floors occupy considerably the greater part of the plate area, and the width of any one section of the foraminous floor supplied by any one duct, regardless of the length of the plate, being so proportioned with respect to said duct that the vapor supplied by immediate adjacent sections of the duct can be uniformly distributed over the foraminous floor.

7. A column of the kind described divided into a plurality of spaced plates, each plate comprising an endless receiver trough and an overlying endless bubbler trough, the latter having a foraminous floor intruding into the underlying cooperating receiver trough, the floors of said troughs being spaced apart to provide a vapor space therebetween; overflow means within and extending above the foraminous floor of each plate arranged to discharge above the foraminous floor of the lower plate, the side walls of said bubbler trough extending above the walls of the receiver trough and being spaced therefrom to provide a plurality of vapor ducts substantially co-extensive with the adjacent side or sides of the bubbler trough and in open communication with the vapor space formed between the spaced floors of said troughs; the width, in the direction of vapor flow, of any one section of the foraminous floor being such that the vapor supplied by the immediately adjacent portions of the vapor duct can be uniformly distributed under the foraminous floor and substantially the whole of the liquid being retained above such floors during the normal working of the column.

8. A square or rectangular column comprising multiplicity of superimposed bubbler plates, each plate divided into a plurality of rectangular receiver troughs and a plurality of rectangular bubbler troughs underlying the said receiver troughs; the bubbler troughs having foraminous floors intruding into the underlying receiver troughs, the floors of said bubbler and receiver troughs being spaced apart to provide a vapor space therebetween and the side walls of said bubbler troughs being spaced from the side walls of the cooperating receiver troughs thereby providing a plurality of vapor ducts, forming uptake and downtake portions, substantially co-extensive with the adjacent sides of the cooperating bubbler trough and in communication with the vapor space formed between the spaced floors of the troughs, the said ducts being so proportioned and arranged that the ratio of the vapor velocity in the ducts to the velocity of vapor flow in the body of the column is substantially uniform throughout, and the width of the foraminous floor of any one bubbler trough supplied by any one duct so proportioned with respect to the area of the said duct that the rising vapor can be substantially uniformly distributed over the foraminous floor of the substantially whole liquid retained above such floors during the normal working of the column; and overflow means within and depending from a point above the foraminous floor of the bubbler troughs to a point above the foraminous floor of the bubbler trough below and arranged to distribute liquid above the foraminous floor of the bubbler trough of a lower plate.

9. A column of the kind described comprising a multiplicity of spaced bubbler-plates, each plate being divided into a plurality of bubbler troughs having foraminous floors, and receiver troughs underlying said bubbler troughs with their floors and side walls in spaced relation; overflow means extending above the foraminous floors of each plate arranged to discharge liquid above the foraminous floor of a lower plate, the spacing of the floors and sides of cooperating bubbler and receiver troughs of each plate providing respectively a plurality of vapor spaces and vapor ducts the latter being substantially co-extensive with the side or sides of the bubbler troughs and in communication with the vapor space formed between the floors of said troughs, the ducts and troughs of one set of plates being laterally offset in respect to those of an adjacent plate in the column, and each alternate plate comprising two troughs approximately half the width of the troughs in the adjacent plates above and below, the large troughs being arranged to be supplied with vapor from the ducts at both sides thereof, the width of the foraminous floor supplied by any one duct being not greater than 9 inches so that the vapor can be distributed to the foraminous floor and substantially the whole of the liquid retained above such floors during the normal working of the column.

10. A bubbler plate of the kind described dividing into a plurality of bubbler troughs having foraminous floors and a plurality of cooperating underlying receiver troughs in spaced relation therewith; each of said cooperating troughs having continuous peripheral side walls arranged in spaced relation and providing therebetween a plurality of vapor ducts which are substantially co-extensive to the adjacent side or sides of the bubbler troughs and in communication with the space between the floors of the troughs; overflow means extending from a point above the foraminous floor downwardly through said receiver troughs adapted to discharge liquid above the foraminous floor of a lower plate; one of said bubbler troughs of the plate being adapted to be supplied with vapor rising through a duct at each side thereof and two of the bubbler troughs of said plate being substantially half the width of said first mentioned trough, each of said half troughs being arranged and adapted to be supplied with vapor from a duct at one side thereof only, the width of each of said half troughs being approximately 9 inches so that the vapor can be distributed substantially uniformly over the foraminous floor and substantially the whole of the liquid retained above such floor during the normal working of the column.

11. A column of the kind described comprising a multiplicity of superimposed bubbler plates arranged in spaced relation, each of said plates comprising a bubbler trough having a foraminous floor and a receiver trough underlying said bubbler trough with its floor in spaced relation therewith; each of said bubbler troughs having continuous peripheral side walls arranged in spaced relation with the side walls of its cooperating receiver trough thereby providing a plurality of vapor ducts substantially co-extensive with the adjacent sides of the bubbler trough and in communication with the space formed between the floors of said troughs and adapted to lead the rising vapor to the vapor space from both sides of the bubbler troughs, alternate ones of said bubbler plates being divided into two cooperating bubbler and receiver troughs approximately half the width of the trough provided in the plates intervening, the side walls of the said half size receiver troughs being spaced apart to provide a vapor duct common to both said half troughs and staggered with respect to the vapor duct formed between receiver troughs in the alternate plates; and overflow means for each plate comprising a conduit member extending from a point within and above the foraminous floor of the bubbler trough of one plate and arranged to discharge above the foraminous floor of the bubbler trough a lower plate; the width of any one bubbler trough or trough section supplied by any one vapor duct being such that the vapor supplied by the duct can be distributed substantially uniformly under the foraminous floor and substantially the whole of the liquid retained above such floors during the normal working of the column.

12. A combination set forth in claim 3 in which the perforations in the forminated floor of the bubbler trough vary in size in the direction of the width of the floor.

13. A section of a bubbler column combining a shell, a bubbler plate housed within said shell, said plate being divided into a plurality of bubbler troughs having foraminous floors intruding into and spaced from the floors of underlying cooperating receiver troughs; overflow means extending above the foraminous floors and arranged to discharge liquid above the foraminous floor of a lower plate; said troughs being spaced with respect to each other to provide a plurality of communicating uptake and downtake vapor ducts substantially co-extensive with the adjacent side or sides of the bubbler troughs and in communication with the space formed between the spaced floors of the cooperating bubbler and receiver troughs, the flow capacity in the direction of the vapor flow of any one bubbler trough supplied by any one duct being no greater than the flow capacity of adjacent portions of the duct so that the vapor can be distributed substantially uniformly over the foraminous floor and substantially the whole of the liquid retained above such floor during the normal working of the column; ledges on the column shell for supporting said receiver troughs, and means between the cooperating receiver troughs and bubbler troughs for maintaining said troughs in predetermined spaced relation.

JOHN HENRY WEST.